(12) United States Patent
Moliner (10) Patent No.: US 6,182,876 B1
(45) Date of Patent: Feb. 6, 2001

(54) ATTACHMENT MECHANISMS FOR SECURING UTILITY RACKS TO VEHICLES

(75) Inventor: Michael Moliner, Eastman (CA)

(73) Assignee: Sportrack International Inc., Grandy (CA)

(*) Notice: Under 35 U.S.C. 154(b), the term of this patent shall be extended for 0 days.

(21) Appl. No.: 09/274,589

(22) Filed: Mar. 23, 1999

(30) Foreign Application Priority Data

Mar. 23, 1998 (CA) .................................................. 2232829

(51) Int. Cl.[7] ........................................................ B60R 9/00
(52) U.S. Cl. ........................... 224/321; 224/322; 224/329; 224/331
(58) Field of Search ................................... 224/321, 309, 224/315, 322, 329, 331, 323

(56) References Cited

U.S. PATENT DOCUMENTS

| | | | |
|---|---|---|---|
| 3,917,136 | * 11/1975 | Carson | 224/331 |
| 5,104,020 | * 4/1992 | Arvidsson et al. | 224/331 |
| 5,275,320 | * 1/1994 | Duemmler | 224/319 |
| 5,400,938 | * 3/1995 | Kolodziej et al. | 224/321 |
| 5,826,765 | * 10/1998 | Rak et al. | 224/321 |

FOREIGN PATENT DOCUMENTS

| | | | |
|---|---|---|---|
| 32 01 171 | 7/1983 | (DE) . | |
| 36 14 740 | 11/1987 | (DE) . | |
| 37 29 641 | 3/1989 | (DE) . | |
| 40 07 263 | 9/1990 | (DE) . | |
| 40 27 452 | 3/1992 | (DE) . | |
| 4320762 | * 1/1994 | (DE) | 224/331 |
| 197 15 924 | 10/1998 | (DE) . | |
| 0 205 414 | 12/1986 | (EP) . | |
| 542017 | * 5/1993 | (EP) | 224/331 |
| 1211727 | * 10/1959 | (FR) | 224/331 |
| 2 631 905 | 12/1989 | (FR) . | |
| 6-107077 | * 4/1994 | (JP) | 224/331 |
| WO 94/08818 | * 4/1994 | (FR) | 224/331 |
| WO96/31366 | 10/1996 | (WO) . | |

* cited by examiner

Primary Examiner—Allan N. Shoap
Assistant Examiner—Maerena W. Brevard
(74) Attorney, Agent, or Firm—Rader, Fishman & Grauer PLLC (57) ABSTRACT

For securing an object carrying device to a vehicle of type having a pair of opposed supports and a carrier bar extending therebetween, there are proposed a series of brackets and clip mechanisms which are mounted to each support of the object carrying device and which can be firmly attached to various types of gutters found on the roofs of different vehicles.

13 Claims, 7 Drawing Sheets

ATTACHMENT MECHANISMS FOR SECURING UTILITY RACKS TO VEHICLES

BACKGROUND OF THE INVENTION

1. Field of the Invention

The present invention relates to brackets and clip mechanisms for securing utility racks to various vehicles and, more particularly, to different types of gutters and anchors provided on such vehicles.

2. Description of the Prior Art

It is frequently necessary for owners of vehicles, such as cars, to install on the roof thereof a utility rack in order to carry on the utility rack various objects which are either too awkward or too large to be positioned within the vehicle, whereby it becomes preferable to carry these objects on the outside of the vehicle. Accordingly, many utility racks have been designed to be fastened to the vehicles with a view of carrying objects, such as skis, bicycles, sailboards, etc. Regardless of the areas of attachment to the vehicle, a carrying device such as a utility rack must meet certain criteria. For instance, the utility rack must be firmly attached to the vehicle and remain secure during all of the normal motions encountered by the vehicle, such as acceleration, deceleration, turns, and also sudden movements. The attachment points have to be firm and must be able to bear the weight of the intended load. The carrier should be easy to attach to and remove from the vehicle. If the carrying device is basically permanently mounted to the vehicle, the vehicle should not require any alteration whatsoever and should retain its original appearance if the carrying device is removed therefrom.

It is already well known to mount the utility rack in the grooves defined in the gutters which are located along the longitudinal edges of the roof of the vehicle, these gutters being called outside gutters as opposed to inside gutters which refer to gutters which are only visible when the doors of the vehicle are open. Various vehicles are now provided with different configuration of gutters as well as, in some cases, with anchors disposed in these gutters. It is thus necessary to provide utility racks having various anchoring mechanisms in order to allow them to be securely fastened to the vehicle.

SUMMARY OF THE INVENTION

It is therefore an aim of the present invention to provide various attachment mechanisms for securing utility racks to vehicles.

It is also an aim of the present invention to provide various attachment mechanisms which can be adapted to a single utility rack for allowing a same utility rack to be installed on various vehicles and, more particularly, on various configurations of gutters provided on the roofs of such vehicles.

Therefore, in accordance with the present invention, there is provided a bracket for removably attaching an object carrying device to a vehicle of type having a pair of opposed supports and a carrier bar extending therebetween wherein at least one of the supports is capable of displacement along the carrier bar, said bracket being provided at each support, comprising a lower hook portion adapted to engage a protrusion of the roof of the vehicle, and an upper load bearing portion adapted to be fastened to the support and against an inside face thereof, such that once said hook portions of two brackets have been positioned outwardly of respective protrusions of the roof, at least once support is displaced inwardly such that said brackets engage the protrusions and thus secure the supports and the object carrying device to the roof, wherein outward anchoring stresses applied on said brackets are sustained by substantially the whole supports.

Also in accordance with the present invention, there is provided a clip mechanism for removably attaching an object carrying device to a roof gutter of a vehicle of type having a pair of opposed supports and a carrier bar extending therebetween, the gutter having therein an upwardly protruding anchor having opposed protruding ends, comprising a clip means having a pair of displaceable jaws and a web portion therebetween, a threaded member at said web portion, a bolt engaged in said threaded member, said bolt being mounted in the support, wherein rotation of said bolt causes said threaded to elevate thereby pulling on said web portion and forcing said jaws inwardly into engagement with the protruding ends of the gutter's anchor and thus securing the object carrying device to the roof.

Further in accordance with the present invention, there is provided a clip mechanism for removably attaching an object carrying device to a roof gutter of a vehicle of type having a pair of opposed supports and a carrier bar extending therebetween, the gutter defining inwardly projecting upper lips, comprising a inverted U-shaped member having a pair of side arms defining lower hook portions, a bolt mounted in the support and extending through said U-shaped member, a spreading member located between said side arms and threadably engaging said bolt, wherein when said bolt is rotated said spreading member is forced to elevate thereby spreading said side arms such that said hook portion engage the lips of the gutter and thus securing the object carrying device to the roof.

Still further in accordance with the present invention, there is provided a bracket for removably attaching an object carrying device to a roof gutter of a vehicle of type having a pair of opposed supports and a carrier bar extending therebetween, the gutter having therein an upwardly extending partition defining at an upper end thereof a side anchor, comprising a lower hook portion adapted to engage the side anchor, support means adapted to abut the partition on a side opposite the side anchor thereof, and upper body having a threaded member, and a bolt mounted in the support and threadably engaging the threaded member, whereby, once said hook portion has been engaged to the side anchor with said support means being located on said opposite side of the partition, said bolt is rotated thereby elevating said body and firmly anchoring said hook portion to the side anchor of the partition wall of the gutter and thus securing the object carrying device to the roof.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
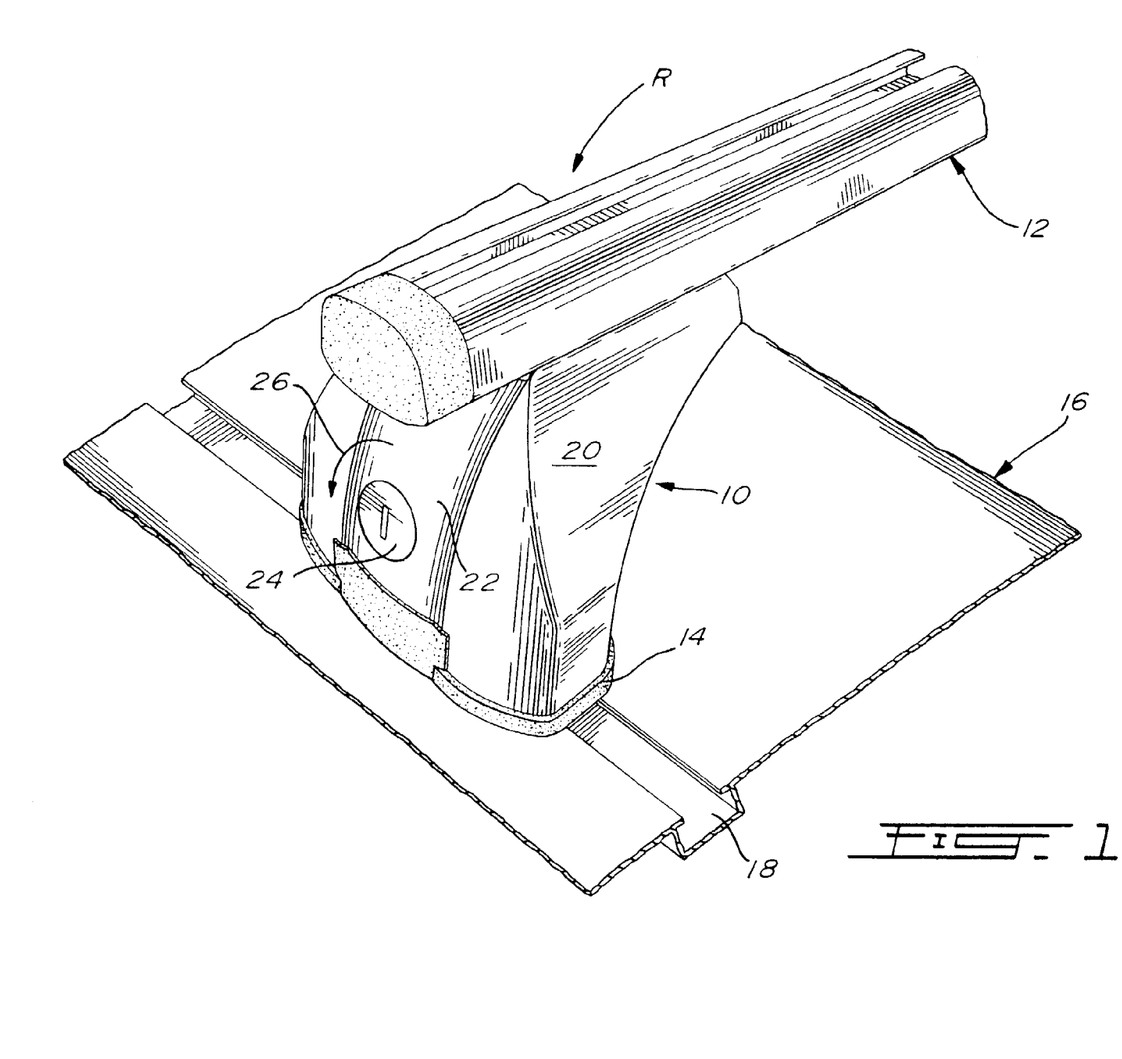
FIG. 1 is a perspective view of one end of a utility rack in accordance with the present invention which is shown mounted to a gutter defined in the roof of a vehicle, this roof being only partly shown.

FIG. 1 illustrates part of a utility rack R provided at the opposed ends thereof with a pair of feet or supports 10, only one such support 10 being shown in FIG. 1. The utility rack R also includes a bridge or carrier bar 12 which joins both supports 10. Each support 10 includes a high friction resilient and protective sole 14 for overlying a roof 16 (only partly shown in FIG. 1) of a vehicle which is not shown herein. The roof defines in FIG. 1 a gutter 18 with the support 10 being securely anchored thereto, as explained in details hereinbelow. The support 10 includes a hollow housing 20, a pivotable door 22 to provide access to the inside of the housing 20, this door 22 being lockable by way of a lock mechanism 24. The door is adapted to pivot in a plane transversal to the roof 16 and along a longitudinal axis of the carrier bar 12, as seen by arrow 26 (see FIG. 1).

Figure 2:
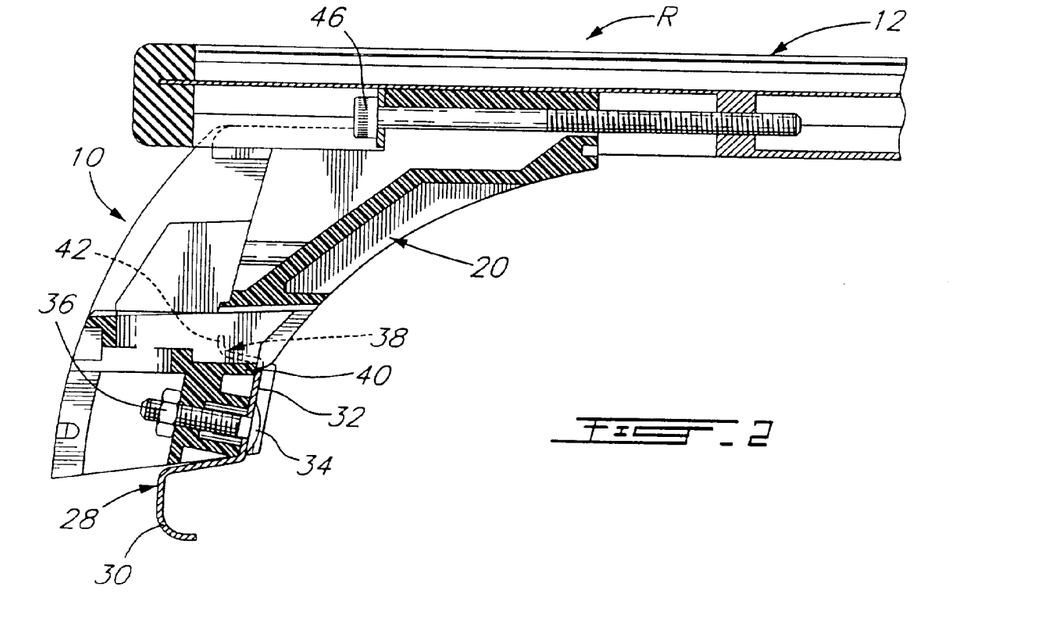
FIG. 2 is a vertical cross-sectional view of the utility rack of FIG. 1 which is provided with a first bracket in accordance with the present invention adapted to be secured to a roof of the vehicle.
Figure 3:
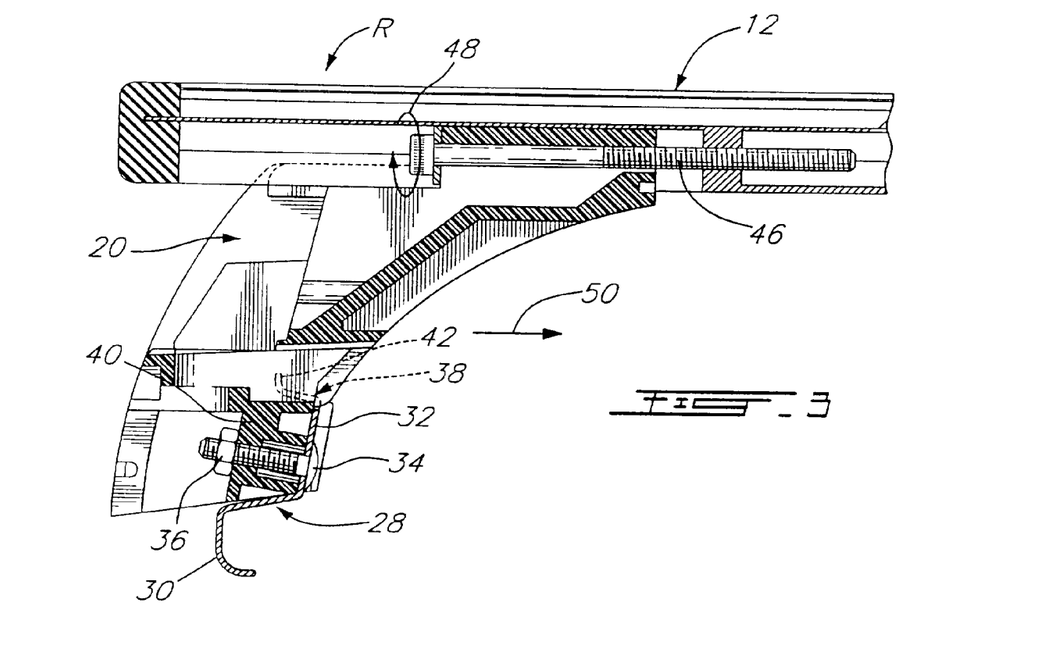
FIG. 3 is a vertical cross-sectional view similar to that of FIG. 2 but showing how a support of the utility rack is translationally displaced inwardly and transversally along the roof of the vehicle for securing the utility rack thereto.

Now referring to FIGS. 2 and 3, a first bracket 28 is shown assembled to the support 10 of the utility rack R. The first bracket 28 includes a lower hook portion 30 adapted to engage the roof of the vehicle, an intermediate straight portion 32 defining a hole therein such that the first bracket 28 can be secured to the support 10 by way of bolt 34 and nut 36, and an upper multi-hook portion 38 which includes two end elbows (not shown) adapted to abuttingly overly a structural member 40 of the support 10 and which further includes a pair of upper hooks 42, located between the aforementioned end elbows, and adapted to be engaged in slots 44 (see FIGS. 4 and 5) located above the structural member 40. Therefore, the first bracket 28 is engaged to the support 10 by its upper hooks 42 engaging the slots 44 and with the end elbows of the bracket 28 overlying the structural member 40 of the support 10; the intermediate portion 32 bears against the inner side wall of the structural member 40 and the lower hook portion 30 is adapted to engage a rib or protrusion defined by the roof.

It is noted that at least one of the end supports 10 of the utility rack R is capable of being displaced translationally along, and relative to, the carrier bar 12 such as to vary the span between the two supports 10. In the embodiment shown in FIGS. 2 and 3, the hook portions 30 of the brackets 28 of both supports 10 are sufficiently spaced apart such that they can be lowered and positioned outwardly of the roof's rib or protrusion which they will engage. Then, with the door 22 being open, bolt 46 is rotated (typically with an Allen key) along arrow 48 of FIG. 3 such as to displace the support 10 along arrow 50 respective to the carrier bar 12. The inward transitional displacement of the support 10 causes the hook portions of both the brackets 28 to firmly engage the roof of the vehicle thereby solidly anchoring the utility rack R thereto. As opposed to prior art racks where the hook engaging the roof is disposed outwardly of the rack's foot support, the present first bracket 28 is disposed inwardly of the support 10 such that the load that the first bracket 28 is bearing when the rack R is secured to the roof is also being sustained by the whole support 10, whereby the present invention provides a much more solid assembly of a roof engaging bracket with an end support of a rack. With the anchor plate or first bracket 28 on the inside of the support 10, the support 10 does not deform under anchoring stress.

Figure 4:
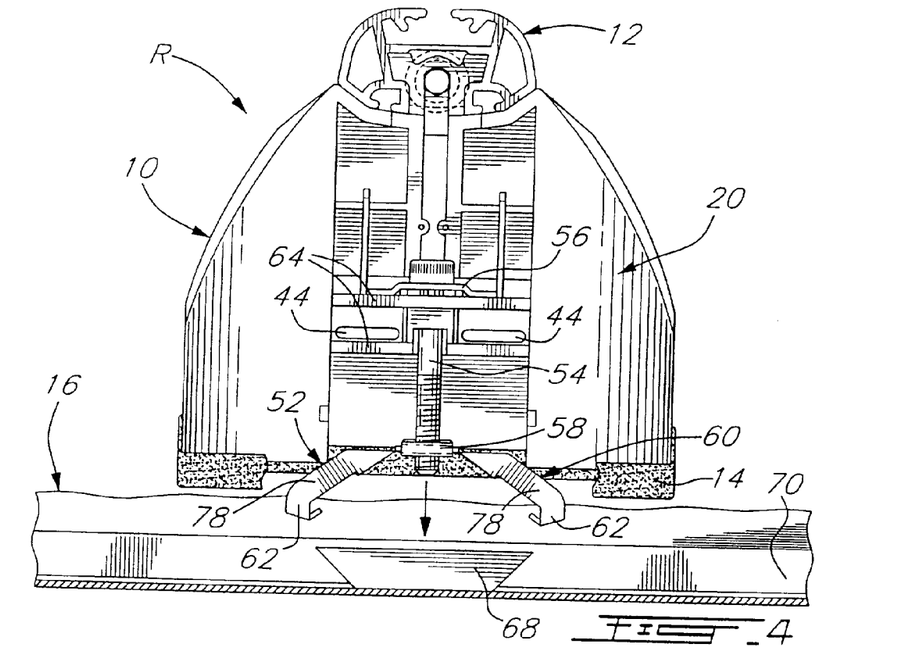
FIG. 4 is an end elevational view, partly in cross-section, of the utility rack of FIG. 1 provided with a first clip mechanism also in accordance with the present invention for attaching the utility rack to an anvil or a generally T-shaped anchor provided in the gutter of the roof of the vehicle, the utility rack being shown as the first clip mechanism is being lowered into the gutter in an expanded position thereof.
Figure 5:
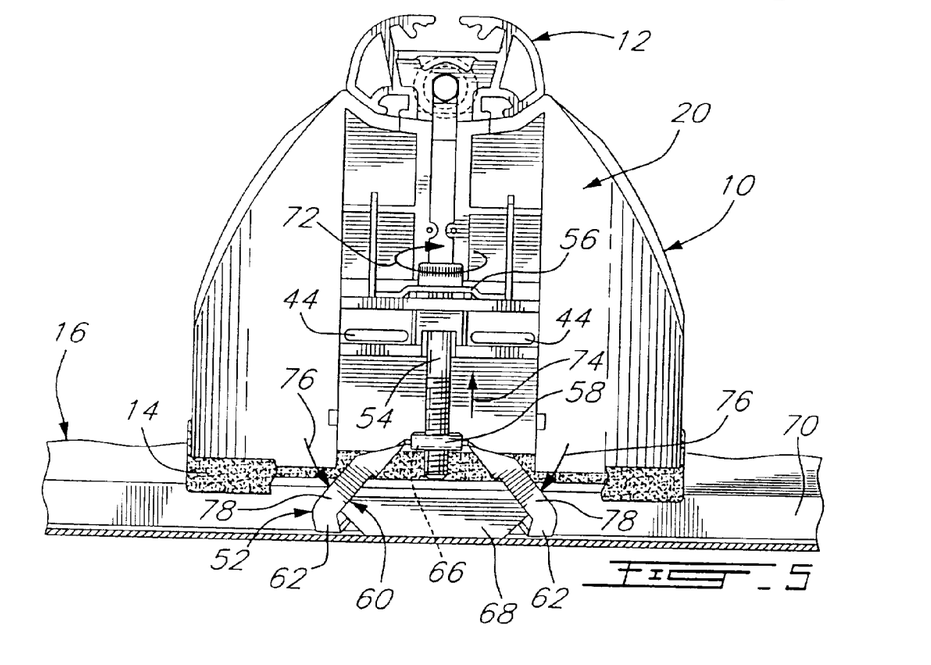
FIG. 5 is an end elevational view, partly in cross-section, similar to that of FIG. 3 but showing the first clip mechanism in a collapsed position and engaged to the T-shaped anchor thereby securing the utility rack to the roof of the vehicle.
Figure 6:
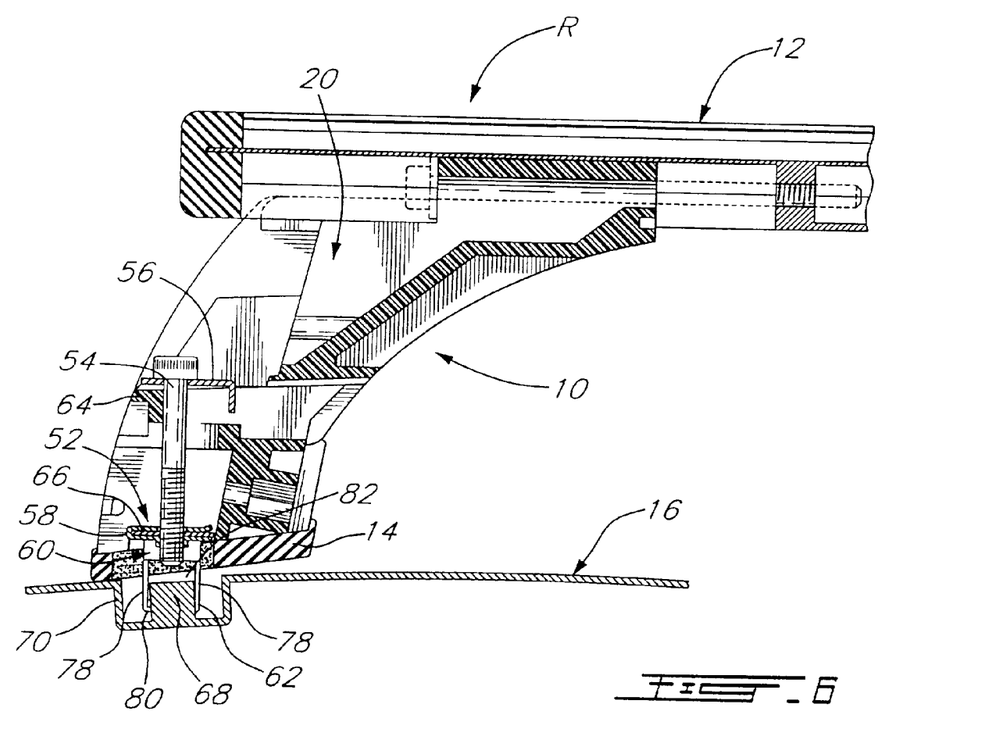
FIG. 6 is a vertical cross-sectional view of the utility rack and first clip mechanism of FIG. 4.

FIGS. 4 to 6 illustrate the utility rack R provided with a first clip mechanism 52 which includes a bolt 54, an upper plate 56, a threaded member 58 and a clip 60 provided with a pair of jaws 62. Inside of the housing 20 of the support 10 there are provided a pair of horizontal structural merging walls 64 with the upper plate 56 being located above the upper one of these two walls 64 and with the bolt 54 extending through the upper plate 56 and through holes defined in the horizontal walls 64. The head of the bolt 54 overlies the upper plate 56. The bolt 54 threadably engages the threaded member 58 which has the form of a horizontal U. Between the two jaws 62 of the clip 60, there is an upper web portion which defines an opening through which the bolt 54 freely extends.

FIG. 4 shows the clip 60 in its expanded position, wherein the jaws 62 are sufficiently spaced apart so that the support 10 can be lowered onto the roof with the jaws 62 outwardly clearing a trapezoidal anvil or T-shaped anchor 68 which is permanently secured inside a gutter 70 of the roof. Then, the bolt 54 is rotated as per arrow 72 of FIG. 5 and, as the bolt 54 is restricted by the upper horizontal wall 64, the rotation thereof causes the threaded member 58 to rise (as per arrow 74) along the threaded body of the bolt 54. As the threaded member 58 raises it brings therewith the web portion 66 of the clip 60 thereby causing the jaws 62 to pivot inwardly and downwardly along arrows 76, and against their resiliency, as the utility rack R is held stationary onto the roof 16. This pivot of the jaws 62 causes them to engage the side extensions of the T-shaped anchor 68, whereby the support 10 becomes securely fastened to the T-shaped anchor 68 and thus to the roof 16 of the vehicle. As seen in FIG. 6, each jaw 62 includes a pair of sidewalls 78 which are joined at their lower edges by a bottom wall 80 thereby defining an opening 82 through which the T-shaped anchor 68 can extend.

Figure 7:
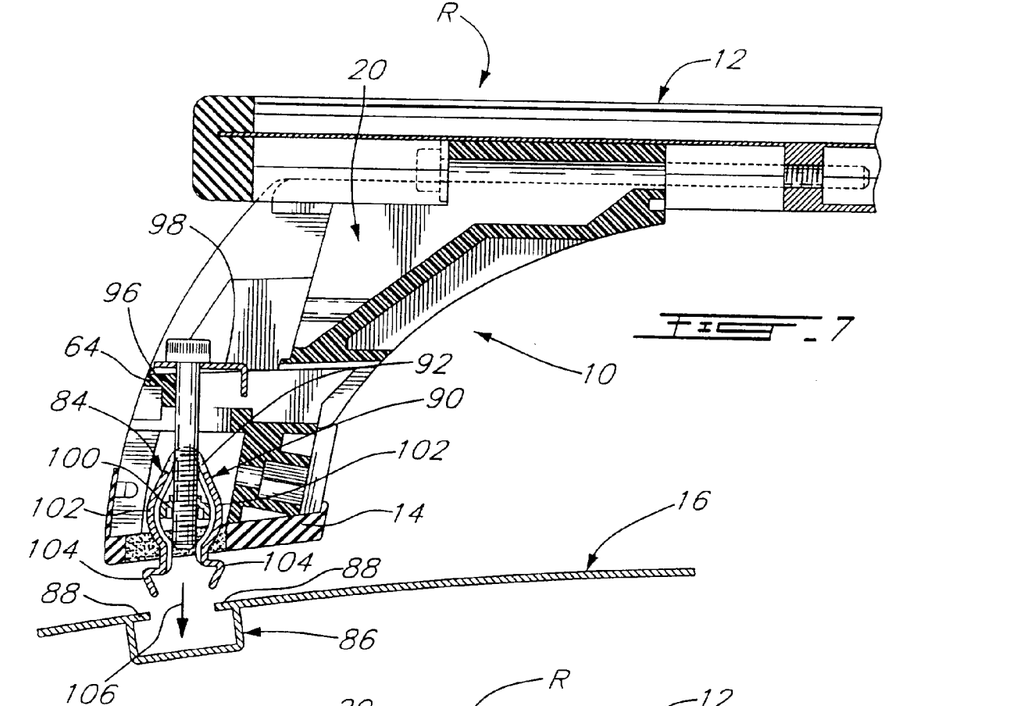
FIG. 7 is a vertical cross-sectional view of the utility rack of FIG. 1 provided with a second clip mechanism further in accordance with the present invention, herein shown in a collapsed position prior to engagement with the gutter defined in the roof of the vehicle.
Figure 8:
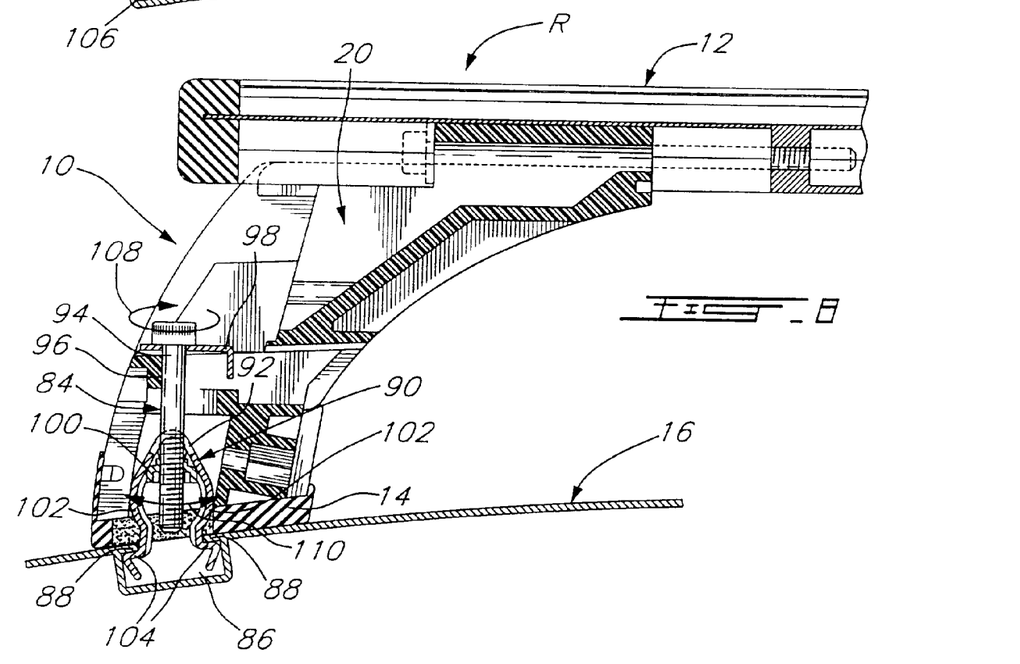
FIG. 8 is a vertical cross-sectional view similar to that of FIG. 7 but showing the second clip mechanism in an expanded position thereof, thereby securing the utility rack to the roof of the vehicle.

FIGS. 7 and 8 illustrate a second clip mechanism 84 for use with a further gutter 86 provided in the roof 16 of the vehicle, the gutter 86 including a pair of inwardly projecting lips 88. The second clip mechanism 84 comprises an elongated inverted U-shaped body 90 defining an opening 92 at its apex, a bolt 94 mounted in the housing 20 of the support 10 as in the case of bolt 54 of FIGS. 4 to 6 in that the bolt 94 extends through an opening 96 defined in structural members 64 of the support 10, and an upper plate 98 disposed between the head of the bolt 94 and the structural members 64 of the support 10. An elongated threaded bar 100 is located between a pair of side arms 102 of the U-shaped body 90. The side arms each define at their lower ends a hook portion 104. In FIG. 7, the threaded bar 100 is located along the bolt 94 such that the hook portions 104 are sufficiently closed together such that the clip mechanism 84 attached to the support 10 of the utility rack R can be lowered into the gutter 86, the hook portions 104 inwardly clearly the lips 88 of the gutter 86 (see arrow 106) when forced therethrough against their resiliency with the hook portions 104 defining angled lower leading edges to facilitate the introduction of the hook portions through the lips 88 and into the gutter 86. Once the hook portions 104 are below the lips 88, the bolt 94 is rotated as per arrow 108 in FIG. 8 and, as the bolt 94 cannot displace downwardly, it causes the threaded bar 10 to raise within the U-shaped body 90 thereby causing the side arms 102 of the body 90 to spread as per arrows 110, possibly against the resiliency of the body 90, until the hook portions 104 become locked below the lips 88 of the gutter 86, whereat the support 10 and the utility rack is firmly anchored to the roof 16.

Figure 9:
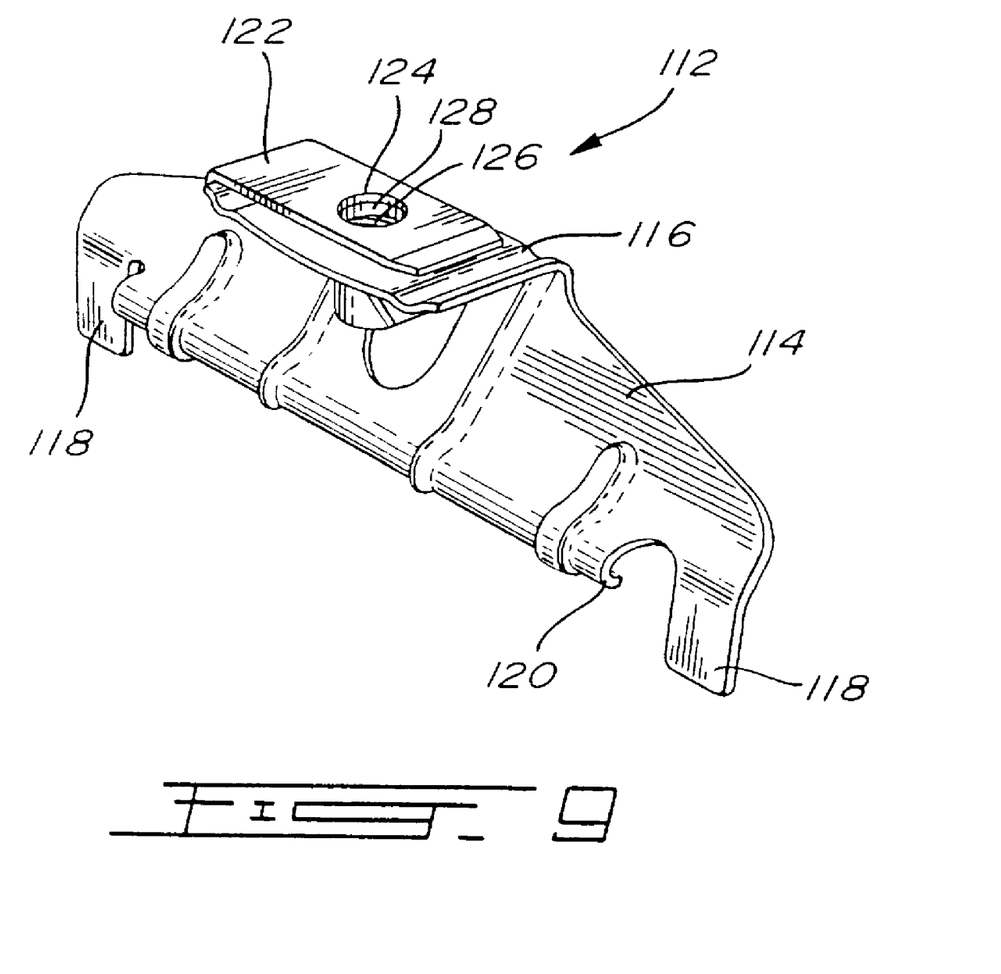
FIG. 9 is a perspective view of a second bracket also in accordance with the present invention for use with the utility rack of FIG. 1.
Figure 10:
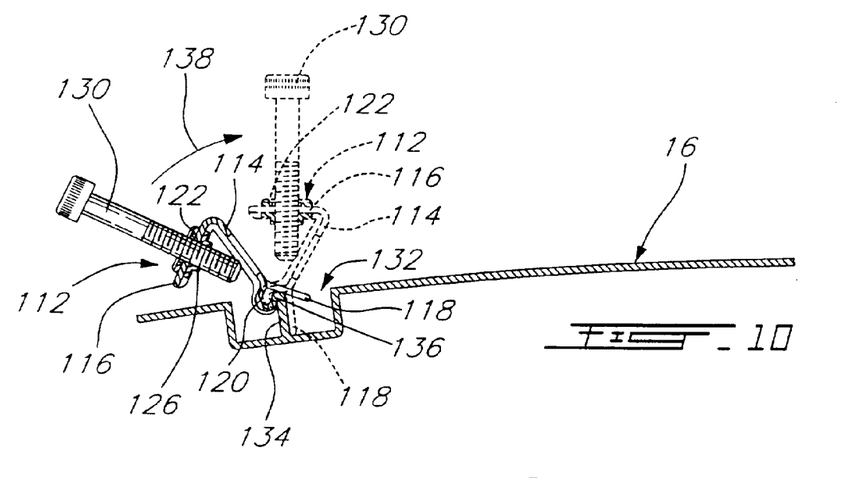
FIG. 10 is a vertical cross-sectional view showing how the second bracket of FIG. 9 is assembled to the roof of the vehicle.
Figure 11:
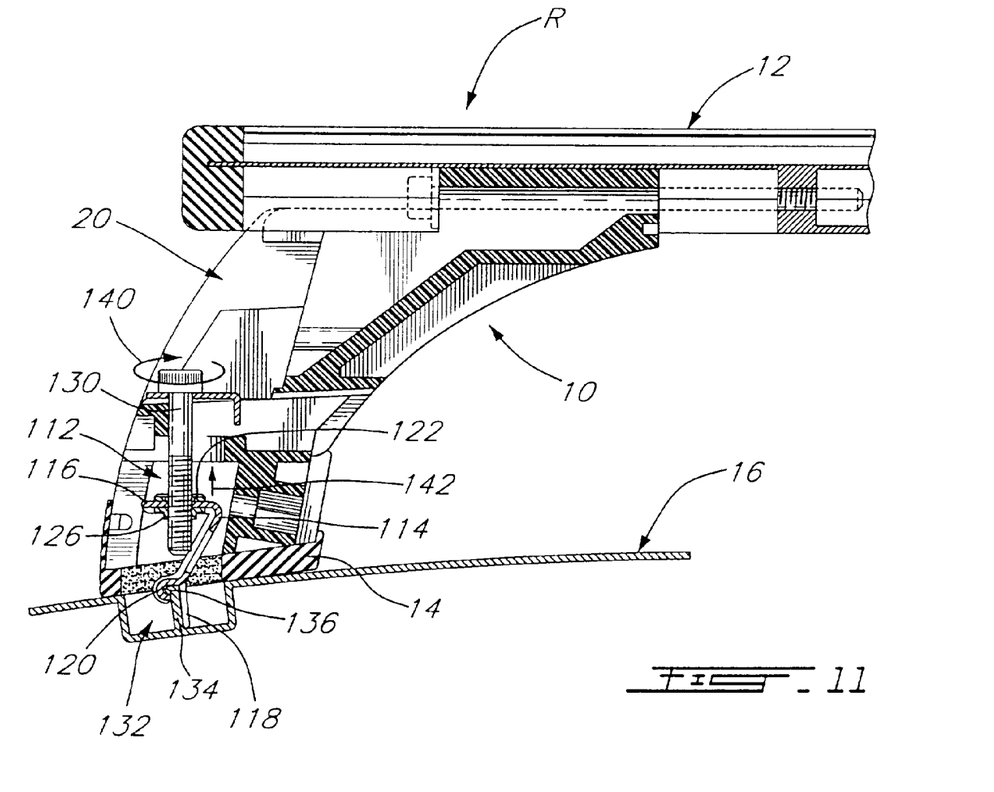
FIG. 11 is a vertical cross-sectional view showing the bracket of FIG. 9 provided in the utility rack of FIG. 1 and securing the latter to the roof of the vehicle.

Now referring to FIGS. 9 to 11, FIG. 9 specifically shows a second bracket 112 provided with an angled intermediate section 114, an upper plate 116 integral to the angled section 114, and a hook assembly integral and provided at the lower end of the angled section 114 and comprising a pair of straight end supports 118 and an elongated central hook portion 120. A U-shaped threaded member 122 (similar to threaded member 58 of FIGS. 4 to 6) is disposed above and below the upper plate 116. The threaded member 122 defines an upper opening 124 and a lower threaded hub 126 (best seen in FIGS. 9 and 10) with the upper plate 116 defining an opening 128 aligned with the threaded hub 126 and the upper opening 124 of the threaded member 122.

Now more specifically referring to FIGS. 10 and 11, the second bracket 112 also includes a bolt 130 which threadably engages the threaded hub 126 of the threaded member 122. The second bracket 112 is adapted to secure the utility rack R to a specific gutter 132 which includes a central raised wall 134 defining a side rib 136 at an upper end thereof. The second bracket 112 is first positioned at an angle (see bracket 112 in solid lines in FIG. 10) such that its central hook portion 120 can engage the side rib 136 while allowing the end supports 118 to slide above the central wall 134, and then the bolt 130 is pivoted along arrow 138 until it adopts a position thereof shown in phantom lines in FIG. 10 whereat the central wall 134 of the gutter 132 is imprisoned between the end supports 118 and the central hook portion 120 which engages the side rib 136 of the central wall 134 of the gutter 132. As seen in FIG. 11, the bolt 130 is then rotated as per arrow 140 and, as the bolt 130 cannot lower, it causes the threaded member 22 to displace upwardly along arrow 142 thereby pulling on the upper plate 116 of the second bracket 112 and thus firmly engaging the central hook portion 20 to the side rib 136.

In all of the above embodiments, it is clear that access to the bolts 34, 54, 94 and 130 is only provided when the door 22 is open. Therefore, as the door 22 is provided with a lock mechanism 24, only the user can open this door 22 and thus access the bolts 34, 54, 94 and 130 to remove the utility rack R from the roof 16 of the vehicle.

The embodiments of the invention in which an exclusive property or privilege is claimed are defined as follows:

1. An object carrying device for use with a vehicle roof having a protrusion, the object carrying device comprising:
   a support, the support including
   a housing,
   a clip mechanism having a first end retained at least partially within said housing, wherein said first end includes an intermediate portion and at least one upper hook portion, wherein one of said intermediate portion and said upper hook portion of said first end is removably secured to a structural member fixed within said housing and wherein said first end further includes a threaded member,
   and a second end extending outwardly of said housing and including at least one lower hook portion adapted to selectively engage the protrusion of the roof, and
   a threaded fastener having a first end with a bolt head terminating within said housing adjacent a fixed anchor point and a second threaded end selectively engaging said threaded member of said clip mechanism, movement of said fastener selectively moving said lower hook portion with respect to said second threaded end of said fastener to attach said clip mechanism to the protrusion of the roof.

2. An object carrying device as recited in claim 1, wherein said roof includes a gutter extending generally perpendicular to said carrier bar, said gutter including an anchor, said anchor including said projection to selectively engage said lower hook portion of said clip mechanism.

3. An object carrying device for use with a vehicle roof having a protrusion, the object carrying device comprising:
   opposed supports, each support including
   a housing,
   a structure having a first end retained at least partially within said housing and a second end extending outwardly of said housing and including at least one hook portion adapted to selectively engage the protrusion of the roof, and
   a threaded fastener having a bolt head terminating within said housing and a second threaded end extending outwardly of said housing; and
   a cross rail disposed between said opposed supports and including a slot, wherein an upper end of each of said supports is received within said slot and an inner side wall of said slot including a threaded member selectively engaging said second threaded end of said fastener such that movement of said fastener relative to said threaded member moves said supports with said hook portion parallel to said cross rail such that said hook portion selectively engages the protrusion of the roof.

4. A support as recited in claim 3, wherein said structure is one of a bracket and a clip mechanism.

5. A clip mechanism for removably attaching an object carrying device to a roof gutter of a vehicle of type having a pair of opposed supports and a carrier bar extending therebetween, the gutter having therein an upwardly protruding anchor having opposed protruding ends, comprising a clip means having a pair of displaceable jaws and a web portion therebetween, a threaded member at said web portion, a bolt engaged in said threaded member, said bolt being mounted in the support, wherein rotation of said bolt causes said threaded member to elevate thereby pulling on said web portion and forcing said jaws inwardly into engagement with the protruding ends of the gutter's anchor and thus securing the object carrying device to the roof.

6. A clip mechanism as defined in claim 5, wherein said jaws are biased towards a spread out position thereof such that, when said web portion is displaced away from the protruding anchor, said jaws pivot inwardly under the protruding ends of the anchor and against a resiliency of said jaws.

7. A clip mechanism as defined in claim 5, wherein said jaws each comprise a pair of spaced side walls joined at distal ends thereof by a bottom wall thereby defining an opening therebetween and said web portion with a respective one of the protruding ends of the anchor extending through said opening at least upon sufficient elevation of said web portion with respect to the anchor.

8. An object carrying device for use with a vehicle roof having a protrusion, the object carrying device comprising:

a support adapted to move parallel to a carrier bar, the support including a housing, a clip mechanism having a first end retained at least partially within said housing and including a threaded member, and a second end extending outwardly of said housing and including two opposing hook portions adapted to selectively engage the protrusion of the roof and a web defined therebetween; and a threaded fastener having a first end with a bolt head terminating within said housing adjacent a fixed anchor point and a second threaded end passing through said web and selectively engaging said threaded member of said clip mechanism, movement of said threaded fastener selectively moving said hook portions toward and away from each other as said threaded fastener is rotated with respect to said fixed anchor point to move said threaded member of said clip mechanism with respect to said second threaded end of said threaded fastener to attach said clip mechanism to the protrusion of the roof.

9. An object carrying device as recited in claim 8, wherein said roof includes a gutter extending generally perpendicular to said carrier bar, said gutter including inwardly projecting lips defining said projections to selectively engage said hood portions of said clip mechanism.

10. An object carrying device as recited in claim 8, wherein said roof includes a gutter extending generally perpendicular to said carrier bar, said gutter including an anchor, said anchor having side walls defining said projections to selectively engage said hook portions of said clip mechanism.

11. A support for removably attaching an object carrying device to a vehicle roof, the vehicle roof having a protrusion, and wherein said support comprises:

a housing;

a clip mechanism having a threaded member, a first end retained at least partially within said housing and a second end extending outwardly of said housing and including opposing hook portions adapted to selectively engage the protrusion of the roof and a web defined between said opposing hook portions; and a threaded fastener having a first end with a bolt head terminating within said housing, wherein said first end engages a fixed anchor point within said housing, and a second end passing through said web, wherein said threaded member of said clip mechanism selectively engages said second end of said fastener to move said hook portions relative to said anchor point to attach said clip mechanism to the vehicle.

12. A support as recited in claim 11, wherein terminating end portions of said hook portions selectively move toward and away from each other as said fastener is rotated with respect to said fixed anchor point to move said threaded member of said clip mechanism with respect to said second end of said fastener.

13. A support as recited in claim 11, wherein said clip mechanism is a single piece, said opposing hook portions being mirror images of one another.

* * * * *